May 9, 1950     H. H. JONES     2,506,720
HYDROCARBON CONVERSION WITH METAL HALIDE CATALYSTS
Filed Jan. 18, 1946
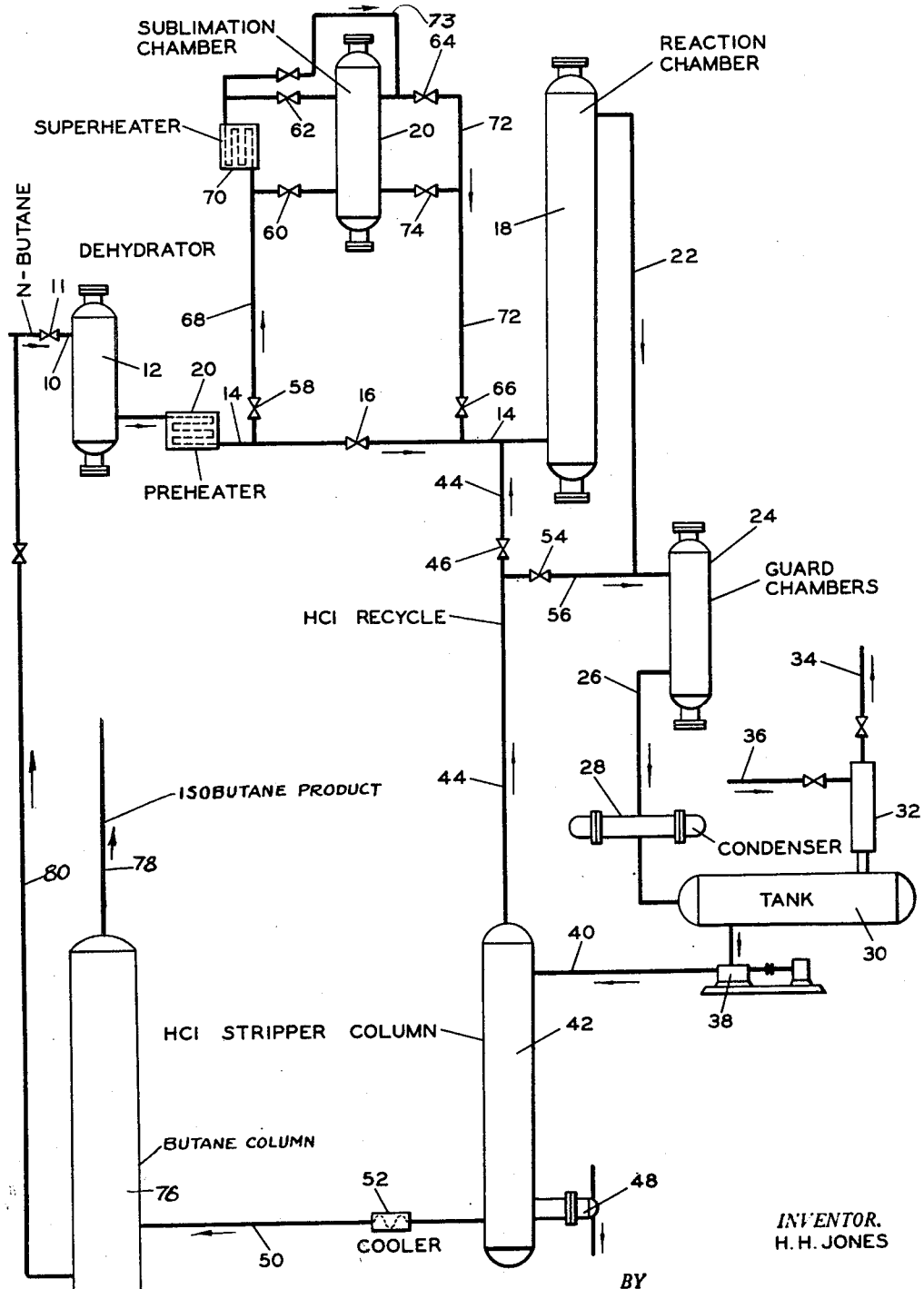
INVENTOR.
H. H. JONES
BY
Hudson and Young
ATTORNEYS Patented May 9, 1950

2,506,720

UNITED STATES PATENT OFFICE 2,506,720

HYDROCARBON CONVERSION WITH METAL HALIDE CATALYSTS

Herbert H. Jones, Bartlesville, Okla., assignor to Phillips Petroleum Company, a corporation of Delaware Application January 18, 1946, Serial No. 642,071

3 Claims. (Cl. 260—683.5)

This invention relates to the catalytic conversion of organic materials. In a preferred embodiment the invention relates to conversion of hydrocarbons in the vapor phase over a Friedel-Crafts type metal halide supported on an adsorptive material.

The conversion of hydrocarbons over catalysts of the type mentioned has become a familiar commercial process. For economic reasons, aluminum chloride is usually the metal halide employed, although other metal halides such as the chlorides, bromides and occasionally the iodides of zinc, tin, arsenic, antimony, zirconium, beryllium, titanium, iron, molybdenum, boron and the like have also been suggested. Among the reactions catalyzed may be mentioned cracking, reforming and polymerization of hydrocarbons; alkylation, for example, alkylation of isoparaffins with olefins such as of isobutane with ethylene to give diisopropyl, or the alkylation of aromatics with olefins such as of benzene with ethylene to give ethyl benzene which is an intermediate in the manufacture of styrene; and various condensation reactions of the Friedel-Crafts type. A particularly important process commercially is the isomerization of saturated hydrocarbons, that is, paraffins and naphthenes. By way of example, the vapor phase isomerization of normal butane to isobutane over a bauxite-aluminum chloride catalyst will be described. Application of the principles of the invention to other conversions and/or catalysts will be apparent to one skilled in the art.

While many solid materials are suitable as supports for aluminum chloride or other metal halide catalysts, some are much superior to others. In general, the better the adsorptive properties of the support, the better the resulting catalyst. Thus, partially or completely dehydrated adsorbents such as bauxite, silica gel, "activated alumina," or fuller's earth, are quite satisfactory. Activated charcoal, pumice, and other adsorbents may also be used. Even nonadsorbent materials, such as porcelain chips, may be used with some success.

In effecting reactions over a supported aluminum chloride catalyst, the activity of the catalyst gradually declines with use due to the formation of aluminum chloride-hydrocarbon complexes and the loss of aluminum chloride from the catalyst by sublimation into the vaporous reaction mixture. One of the most effective manners of operating found to date comprises initiating the reaction with a fresh catalyst at as low a temperature as possible, gradually increasing the temperature to maintain conversion constant, and then after the maximum permissible temperature is obtained, stopping the conversion and reimpregnating the catalyst support with additional amounts of fresh aluminum chloride. This impregnation is best accomplished by passing the vaporized hydrocarbon feed through a body of solid aluminum chloride to sublime the same and then passing the resultant aluminum chloride-rich vapors through the catalyst bed wherein the aluminum chloride is adsorbed by the catalyst support. In general, the presence of a catalyst activator, usually hydrogen chloride, is essential to the reaction. The conversion is stopped as aforesaid by stopping the admixture of the hydrogen chloride with the feed stream. After the sublimation is completed, the hydrogen chloride is again introduced into the feed and the conversion resumed.

In a preferred embodiment, bauxite activated by partial dehydration, for example, the material available under the trade name of "Porocel," is placed in a reaction chamber, and anhydrous aluminum chloride is sublimed onto the bauxite in an amount which may range from 1 to 10% by weight based on the bauxite. This sublimation is accomplished by vaporizing the aluminum chloride in a stream of hot gaseous butane and passing the resulting mixture through the "bauxite" bed at about 300° F. The bauxite adsorbs the aluminum chloride, and catalyst activity is maintained by periodic repetitions of the sublimation. Thus, one complete cycle comprises a conversion period and a sublimation period. By operating in this manner a very long catalyst life is realized. In the case of butane isomerization, the catalyst chamber needs to be dumped only once every few months, unless the catalyst is accidentally poisoned by the inclusion of olefins or heavy hydrocarbons in the feed.

When the time for subliming has arrived, the hydrogen chloride is cut out of the feed, and a purge period may be used to remove most or all of the hydrogen chloride from the reaction chamber before starting sublimation. The sublimation is best carried out without appreciable change of temperature from that used just prior, at the end of conversion part of the cycle. After the desired amount of aluminum chloride is sublimed into the catalyst chamber, the temperature of the feed stream is reduced to the value at which it is desired to initiate the next conversion period. This temperature is ordinarily much lower than the maximum attained at the end of a conversion period.

It is difficult or impossible to effect sublimation in the presence of HCl because of excessive sludge formation both in the subliming chamber and the catalyst chamber itself. However, its absence during the extended sublimation period leaves the catalyst quite free from HCl, and when this promoter is finally reintroduced into the butane feed after sublimation is completed, there is a considerable time lag or "induction period" before appreciable conversion is noted. Apparently it is necessary for the solid catalyst to adsorb a certain amount of hydrogen chloride before the reaction can start. A period of one or more days may elapse in commercial operations before the conversion rate attains its normal value. This delay in "kicking off" of course represents a considerable economic loss.

It is an object of the present invention to provide for the periodic reactivation of a supported metal halide catalyst. Another object of the invention is to effect the conversion of organic materials in the vapor phase with the aid of a Friedel-Crafts type metal halide catalyst activated by hydrogen halide. A further object is to isomerize normal butane to isobutane. Yet another object is to improve the distribution of aluminum chloride within a large bed of supported aluminum chloride catalyst. A further object is to reduce the delay in attaining full conversion rate after catalyst activator is reintroduced into the catalyst chamber subsequent to reactivation of the catalyst. Further objects and advantages of the invention will be apparent, to one skilled in the art, from the accompanying disclosure and discussion.

I have found that the foregoing objects may be attained, when operating an intermittent sublimation process of the type described, by substantially reducing the flow rate of feed during the sublimation period, by-passing a portion of the feed around the subliming chamber (which contains solid aluminum chloride) and through a superheater during the sublimation, maintaining the reduced feed rate during the initial period subsequent to reintroduction of hydrogen chloride into the feed stream after sublimation is complete, and finally increasing the feed rate to its normal value only after the conversion rate has attained normal operating values, for example 35% per pass.

By means of by-passing a portion of the butane around the subliming chamber, and superheating this by-passed stream so that the stream leaving the subliming chamber and which may be almost saturated with aluminum chloride at the prevailing temperature, is effectively raised in temperature and diluted, a much more even disposition of aluminum chloride is insured throughout the bauxite bed than is otherwise obtained. This results in a larger surface of activated catalyst when conversion is started again and consequently there is less delay in obtaining the full conversion rate. Furthermore, it appears that the desired conversion rate is attained much more quickly with a reduced feed rate than with the standard feed rate. The reason for this is not clear, but it has been observed that if a resublimed chamber be placed on-stream for conversion at full flow rate a long period of time may elapse without any reaction commencing. If the flow rate be reduced markedly, the reaction starts very shortly and soon attains full value. The full flow rate can then be reestablished quickly without lowering the per-pass conversion. Thus, the effect of a reduced flow rate is considerably greater than would be anticipated from mere theoretical considerations.

The accompanying drawing shows in somewhat diagrammatic form one arrangement of apparatus elements and flow materials therethrough suitable for the practice of this invention. It will be appreciated that many auxiliary items of equipment, such as heat exchangers, flow controllers, temperature and pressure controllers, pumps, and the like, are not included in the drawing for the sake of simplicity as such elements are readily supplied by one skilled in the art.

In the drawing, normal butane feed is introduced via line 10 and passes through a dehydrating chamber 12 which may, for example, be filled with dehydrated bauxite. The dried stream then passes via line 14 and valve 16 into the bottom of one or more reaction chambers represented by tower 18. Interposed in line 14 is a preheater 20 which is heated with steam or hot oil, or which may be heated by direct firing. Reaction chamber 18 is filled with dehydrated bauxite or other suitable support. Some aluminum chloride may be admixed therewith prior to the first use of the catalyst, or all of the aluminum chloride content of the reaction chamber may be sublimed from subliming chamber 20. The reaction is effected in the vapor phase and at superatmospheric pressures, such as 150 to 250 pounds per square inch gage. Total isomerization effluents pass from chamber or chambers 18 via line 22 through a guard chamber 24, which may contain a bed of dehydrated bauxite for adsorbing traces of aluminum chloride carried out of the reactors, or which may comprise a sulphuric acid scrubber or any other suitable means for removing such aluminum chloride. Effluents then pass through line 26 and condenser 28 where they are condensed to a liquid which flows into stripper feed tank 30. Light gases including hydrogen, methane, ethane and propane tend to accumulate in the system, and these are intermittently or continuously led off from the vapor phase of tank 30 through an absorber 32 and exit through vent 34. A small stream of liquid normal butane is introduced into the top of absorber 32 through line 36 for dissolving HCl from the light gases and returning same to tank 30. Pump 38 is used to pass liquid from tank 30 via line 40 into the top of fractionating column 42. This column serves to strip all of the hydrogen chloride from the condensed isomerization effluents and this hydrogen chloride passes overhead through the line 44 and valve 46 into admixture with the normal butane feed in line 14 just prior to introduction into the catalyst chambers 18. Column 42 is provided with the usual reboiler 48, and the HCl-free hydrocarbon kettle product passes via line 50 and cooler 52 to caustic treatment and subsequent fractionation in unit 76. This fractionation effects separation of isobutane product via line 78 from unreacted normal butane, and the latter is recycled via line 80 to line 10 for further treatment. Small amounts of propane and of pentane and heavier which are produced incidental to the conversion are also separated out.

When a conversion period has been completed, valve 46 is closed and valve 54 is opened, allowing all of the HCl recycle to by-pass the catalyst chambers 18 by way of line 56 which leads into guard chamber 24. Line 56 may alternatively lead into line 26 just ahead of condenser 28. The catalyst chambers may be purged by flow of HCl-free butane feed therethrough for a time if desired. Valve 11 in line 10 is adjusted to give the desired reduced flow rate, valve 16 is closed, and valves 58, 60, 62, 64 and 66 are opened, allowing the feed to pass through the sublimation section of the plant. Valves 60 and 62 are adjusted so that a portion of the preheated feed passes into the bottom of sublimer chamber 20 which is filled with solid aluminum chloride, and upwardly therethrough to carry aluminum chloride out by sublimation. The other portion of the preheated feed passes from line 68 through superheater 70 and valve 62 into admixture with the aluminum chloride-rich stream leaving the body of solid aluminum chloride in chamber 20. While conduits are shown leading the superheated stream into the top of chamber 20, it is obvious that this stream may join line 72 just outside of chamber 20 if desired, as by valved line 73. The combined streams carrying sublimed aluminum chloride pass through line 72, valve 66, and line 14 into the reaction chamber. Valve 74 is provided to allow for occasional reversal of flow through chamber 20 if needed.

As an example of operations under one set of conditions, the following data are given, as used with two 4' diameter by 45' reaction chambers operated in parallel, and containing a total of 38,000 lbs. bauxite activated by dehydration.

At the beginning of the conversion part of the cycle the temperature of the butane feed is 240° F. and the volume is 40,000 gallons per day. After three hours the HCl recycle is turned into the reaction chambers. After about 24 hours, if conversion is not up to 35% to 40% per pass, the temperature is raised 5° to 10° F. As soon as conversion is 35% to 40% the feed volume is increased to 50,000 gallons per day and maintained at that level throughout the conversion step. As the conversion proceeds, the feed temperature is gradually increased to a maximum of 300° F. to maintain the rate of conversion, and as soon as the conversion falls appreciably below 35% at the maximum temperature, the conversion period has been completed. This part of the cycle ordinarily varies from 7 to 15 days, though it may be shorter or longer depending upon the accumulative effect of indeterminate factors. At the end of the conversion period the HCl is by-passed downstream of the reaction chambers into the guard chambers (or below the guard chambers), and normal butane is passed through the reaction chambers at 50,000 gallons per day and 300° F. for a period of 8 to 12 hours to purge HCl from the spaces between the bauxite, and to a certain extent from within the pores of the bauxite.

After purging, the feed rate is reduced to 40,000 gallons per day and the feed diverted to the subliming section of the plant. The feed temperature is still maintained at 300° F., and part of the 40,000 gallons goes through the aluminum chloride bed in the sublimation chamber while the other part goes through a super-heater and around the aluminum chloride bed, thus insuring that the total 40,000 gallons leaving the sublimation section is under-saturated with aluminum chloride. The portion of feed passing through chamber 20 may advantageously range from 40 to 75% of the total. The provision of superheating serves to prevent the deposition of all or most of the aluminum chloride in the lower region of the bauxite bed in the reaction chamber (using upflow), which frequently occurs in the absence of super-heating. This super-heater aids in raising the degree of super-heating of the butane vapors with respect to saturation of aluminum chloride; thus it is possible not only to prevent deposition of aluminum chloride in the lower region of the bauxite bed, but also makes possible the distribution of aluminum chloride by sublimation further up into the bed to any degree desired depending upon the temperature maintained by the super-heater. This degree of control properly handled insures a bauxite bed which is uniformly sublimed with $AlCl_3$, thus insuring a quick start of the reaction, the maximum reaction per pass to isobutane, a longer catalyst life, and prevention of a hot spot in the bottom of the bauxite bed which would tend to coat the bauxite in that region with "complex," thus partially destroying its effectiveness and besides forming an undesirably high percentage of end products such as propane and lighter and pentanes and heavier.

Before starting sublimation, about 1 or 2% or more of aluminum chloride, based on the weight of the bauxite, is put in the sublimation chamber. The volumes and temperatures before-mentioned will remove all of this aluminum chloride from the sublimation chamber in around 6 hours and deposit it in the bauxite chamber. Apparently there is little advantage in using a shorter or longer sublimation period under the above conditions.

Upon completion of the sublimation period, the normal butane feed temperature is reduced to 240° F. and the feed vapor proceeds directly into the reaction chambers. As soon as the effluent temperature of the reaction chambers drops 10° or 15° F. it is assumed that the bauxite bed is cool enough for injection of HCl, at which time the HCl recycle is turned into the reaction chambers. From this point the conversion period, as previously described, proceeds, with the flow rate being increased only when 35% conversion is attained.

The HCl recycle, consisting of approximately 50% HCl, leaves the top of the HCl stripper at 110° to 130° F. and the rate is controlled by a rate of flow controller which is reset slowly by a diaphragm actuated by stripper column pressure. The HCl stripper column bottoms, consisting of propane fed into the system and made in the system, isobutane, unreacted normal butane, and pentanes and heavier fed into the system and made in the system, proceeds through a water cooler to conventional caustic treating and to fractionation for segregation of the mentioned components. The unconverted normal butane plus make-up normal butane is fed to the reaction chambers through bauxite driers to insure an absolute minimum of water entering the system, and then through the vaporizer and to the reaction chambers.

The accompanying table gives more detailed data for one specific cycle of operation; the stream numerals refer to the drawing.

TABLE

SCHEDULE OF OPERATING RANGES

| | Stream from Feed Tanks | Vaporized Feed | Feed Through Sublimer | Feed Around Sublimer Before Superheating | Sublimer to Reactor | Reactor Effluents | HCl Recycle | HCl Stripper Bottoms (Make) |
|---|---|---|---|---|---|---|---|---|
| Stream | 10 | [1] 14 | [2] 60 | [2] 62 | [2] 72 | [1] 22 | 44 | 50 |
| Temp., °F | [3] | 220–325 | 300 | 300 | 315 | 260–365 | 100–130 | 230–235 |
| Pressure, p. s. i. g | [4] | 200–240 | 200–240 | 200–240 | 195–235 | 190–230 | 195–235 | 240–260 |
| Composition, Mol Per Cent: | | | | | | 5.0 | 50.0 | |
| HCl | | | | | | 3.5 | 28.0 | .7 |
| Propane and Lighter | .3 | .3 | .3 | .3 | .3 | 37.1 | 14.0 | 39.7 |
| Isobutane | 5.8 | 5.8 | 5.8 | 5.8 | 5.8 | 53.0 | 8.0 | 58.1 |
| N-Butane | 93.5 | 93.5 | 93.5 | 93.5 | 93.5 | 1.4 | | 1.5 |
| Pentanes and Heavier | .4 | .4 | .4 | .4 | .4 | | | |
| Relative Volumes, G. P. D | 50,000 | 50,000 | 13,000 | 27,000 | 40,000 | 54,300 | 3,700 | 50,600 |

[1] Conditions during operation cycle (not subliming).
[2] Conditions during subliming step.
[3] Atmospheric.
[4] At vapor pres.

The butane flow rate during sublimation and immediately thereafter until conversion is established is preferably from about 60% to about 85% of the flow rate used during the conversion portion of the cycle. The stream by-passed around the subliming chamber is preferably from about 20% to about 60% of the total stream, and is preferably superheated to at least 15° F., on up to say 50 to 75° F. or even higher, above the temperature of the portion of the stream passing through the subliming chamber.

While it is preferred to use as the carrying gas the organic vapor to be converted, other gases, such as hydrogen or nitrogen or an organic vapor different from that being converted, may be used to sublime and carry the metal halide into the catalyst.

It will be appreciated that the foregoing is merely exemplary, and that other conditions and modifications may be used as warranted by any particular situation.

I claim:

1. A process for isomerizing normal butane to isobutane which comprises continuously passing at a given flow rate a vaporized stream of normal butane heated to isomerizing temperatures within the range of about 220 to about 325° F. upwardly through a bed of catalyst comprising aluminum chloride on bauxite, admixing with said butane stream catalyst-activating amounts of hydrogen chloride, separating from the catalyst effluents hydrogen chloride, unreacted normal butane, and isobutane product, recycling so-separated hydrogen chloride to admixture with said butane stream, gradually increasing the temperature to maintain conversion as catalyst activity declines up to a desired maximum temperature within said range, stopping the admixture of hydrogen chloride with said butane stream when rate of conversion falls to an undesired level at said maximum temperature, purging hydrogen chloride from the catalyst by continuing passage of hot HCl-free butane therethrough, diminishing the flow rate of said butane stream to a value of about 60 to 85 per cent of its former value, passing from 40 to 80 per cent of said heated butane stream of reduced flow rate through a body of solid aluminum chloride to vaporize the latter prior to passing said stream through said bed of catalyst, by-passing the remaining portion of said butane stream around said body of aluminum chloride and through a superheater wherein it is additionally heated to a substantially higher temperature, joining the thus-superheated portion of the stream with the aluminum chloride-carrying portion of the stream at a point immediately subsequent to the point at which the latter passes from said body of aluminum chloride thereby producing a combined stream superheated and incompletely saturated with sublimed aluminum chloride, passing the combined stream through said bed of catalyst for a sufficient time to deposit sufficient aluminum chloride on said catalyst to reactivate the same, stopping the passage of said heated butane stream through said body of aluminum chloride and through said superheater and reducing its temperature to a desired minimum within the aforesaid range of 220 to 325° F. but continuing its flow at said reduced flow rate through the bed of reactivated catalyst, reintroducing hydrogen chloride into said butane stream in catalyst-activating amounts to effect a resumption of isobutane production by conversion of normal butane in said catalyst bed, maintaining said reduced flow rate until the extent of conversion reaches about 35 per cent, and then increasing the flow to said given flow rate and repeating the above-described cycle of operations.

2. A process for the conversion of hydrocarbons which comprises continuously passing at a given flow rate a vaporized stream of hydrocarbons heated to conversion temperatures through a bed of catalyst comprising aluminum chloride on a solid adsorbent support, admixing with said stream of hydrocarbons catalyst-activating amounts of hydrogen chloride, gradually increasing the temperature to maintain conversion as catalyst activity declines up to a desired maximum conversion temperature, stopping the admixture of hydrogen chloride with said hydrocarbon stream when rate of conversion falls to an undesired level at said maximum temperature, diminishing the flow rate of said hydrocarbon stream to a value substantially below said given flow rate, passing a portion of said heated hydrocarbon stream of reduced flow rate through a body of solid aluminum chloride to sublime the latter prior to passing said stream through said bed of catalyst, by-passing the remaining portion of said hydrocarbon stream around said body of aluminum chloride and through a superheater wherein it is additionally heated to a substantially higher temperature, joining the thus superheated portion of the stream with the aluminum chloride-carrying portion of the stream at a point immediately subsequent to the point at which the latter passes from said body of aluminum chloride thereby producing a combined stream superheated and incompletely saturated with sublimed aluminum chloride, passing the combined stream through said bed of catalyst for a sufficient time to deposit sufficient aluminum chloride on said catalyst by adsorption to reactivate the same, stopping the passage of said heated hydrocarbon stream through said body of aluminum chloride and through said superheater and reducing its temperature to a desired minimum conversion temperature but continuing its flow at said reduced flow rate through the bed of reactivated catalyst, reintroducing hydrogen chloride into said hydrocarbon stream in catalyst-activating amounts to effect a resumption of hydrocarbon conversion in said catalyst bed, maintaining said reduced flow rate until the extent of conversion increases to a desired level, and then increasing the flow of said given flow rate and repeating the above-described cycle of operations.

3. In the vapor-phase conversion of hydrocarbons over a supported Friedel-Crafts type metal halide catalyst wherein the conversion is periodically stopped when the per-pass conversion falls to a predetermined minimum value and said catalyst is then reactivated by addition of metal halide thereto, the improvement which comprises initiating flow of vapors of said hydrocarbons at conversion conditions over a freshly-reactivated catalyst at a flow rate substantially below the flow rate which is optimum for the greater part of the conversion period, continuing said low flow rate until the per-pass conversion increases to the aforesaid minimum value, and then increasing the flow rate to said optimum rate for the balance of the conversion period.

HERBERT H. JONES.

REFERENCES CITED

The following references are of record in the file of this patent:

UNITED STATES PATENTS

| Number | Name | Date |
|---|---|---|
| 2,342,124 | Danforth | Feb. 22, 1944 |
| 2,346,527 | Warrick et al. | Apr. 11, 1944 |
| 2,367,333 | Callaway et al. | Jan. 16, 1945 |
| 2,403,181 | Jones | July 2, 1946 |
| 2,407,488 | Franklin | Sept. 10, 1946 |
| 2,407,637 | Fawcett | Sept. 17, 1946 |
| 2,423,845 | Myers | July 15, 1947 |

FOREIGN PATENTS

| Number | Country | Date |
|---|---|---|
| 556,894 | Great Britain | Oct. 27, 1943 |